United States Patent
Chiba et al.

(10) Patent No.: US 6,174,944 B1
(45) Date of Patent: Jan. 16, 2001

(54) POLYCARBONATE RESIN COMPOSITION, AND INSTRUMENT HOUSING MADE OF IT

(75) Inventors: Jiro Chiba; Masahiro Kitayama, both of Ichihara (JP)

(73) Assignee: Idemitsu Petrochemical Co., Ltd., Tokyo (JP)

( * ) Notice: Under 35 U.S.C. 154(b), the term of this patent shall be extended for 0 days.

(21) Appl. No.: 09/280,723

(22) Filed: Mar. 30, 1999

(30) Foreign Application Priority Data

May 20, 1998 (JP) .................................................. 10-138700

(51) Int. Cl.$^7$ ....................................................... C08K 5/52
(52) U.S. Cl. .......................... 524/127; 524/141; 524/145; 524/270; 524/482; 524/490
(58) Field of Search .................................... 524/270, 482, 524/490, 126, 127, 141, 145; 525/67

(56) References Cited

U.S. PATENT DOCUMENTS

| | | | |
|---|---|---|---|
| 4,572,874 | * | 2/1986 | Chang et al. ........................ 525/194 |
| 4,888,388 | * | 12/1989 | Hongo et al. ......................... 525/67 |
| 4,927,880 | * | 5/1990 | De Rudder et al. .................... 525/63 |
| 5,157,065 | * | 10/1992 | Fuhr et al. ........................... 524/141 |
| 5,204,394 | * | 4/1993 | Gosens et al. ....................... 524/125 |
| 5,240,978 | * | 8/1993 | Fuhr et al. ........................... 524/141 |
| 5,504,130 | * | 4/1996 | Riding et al. ........................ 524/270 |
| 5,534,590 | * | 7/1996 | Horiie ................................. 525/68 |
| 5,807,914 | * | 9/1998 | Obayashi et al. .................... 525/267 |

* cited by examiner

Primary Examiner—Veronica P. Hoke
(74) Attorney, Agent, or Firm—Oblon, Spivak, McClelland, Maier & Neustadt, P.C.

(57) ABSTRACT

Provided are a flame retardant polycarbonate resin composition and housings of the composition for electric and electronic instruments and appliances. Having good fluidity and good moldability, the composition can be well molded into thin-wall moldings with good appearance. The composition contains additive components of a fibrous filler, a terpene resin, a composite rubber-based graft copolymer, a halogen-free phosphate compound and a polytetrafluoroethylene.

9 Claims, No Drawings

POLYCARBONATE RESIN COMPOSITION, AND INSTRUMENT HOUSING MADE OF IT

BACKGROUND OF THE INVENTION

1. Field of the Invention

The present invention relates to a polycarbonate resin composition and to housings made of it for electric and electronic instruments and others. More precisely, it relates to a polycarbonate resin composition having good moldability to give moldings with good appearance, good flame retardancy, high rigidity and high impact strength, and also to housings made of the resin composition for electric and electronic instruments and others.

2. Description of the Related Art

As having high mechanical strength and good electric and optical properties, polycarbonate resins are widely used in various fields of electric and electronic instruments, car parts, office appliances, building materials, etc.

The recent tendency in those application fields is toward compact and lightweight moldings, for which is required further improvement in the properties of the molding materials. For example, in fabricating housings for portable, electric and electronic instruments, portable office appliances and others, the wall thickness of the housings must be as thin as possible. However, moldings with thin walls often have poor rigidity and low impact strength, and are easily combustible. In addition, for such moldings with thin walls, the molding materials are required to have high fluidity while they are molded.

The technical problems with such compact and lightweight moldings are being solved by the development of polycarbonate resin compositions containing various additives. However, practicable molding materials capable of being molded into thin-wall moldings which have satisfactory rigidity and impact resistance and have good appearance and which have no negative influences on the environment after scrapped are not as yet known.

In particular, regarding the negative influences of scrapped resin moldings on the environment, the problem is the formation of harmful substances from halogen-containing flame retardants that are added to the moldings for the purpose of making the moldings resistant to flames. Various methods have heretofore been investigated for attaining the flame retardancy of the resin moldings, without using halogen-containing flame retardants. For example, JP-A-62-4746 has proposed a method of alloying a butadiene-free styrene and a polycarbonate resin to give halogen-free, flame-retardant polycarbonate resins. However, the resin products produced in the proposed method could not be put into practical use, since their impact strength is extremely low. On the other hand, JP-A-2-32154 has proposed a method of alloying a styrene-containing graft copolymer such as an acrylonitrile-butadiene-styrene resin or the like, with a polycarbonate resin. The fluidity of the alloyed resins is increased and the moldability thereof is improved. However, the method is still problematic in that the alloyed resins inevitably lose the high rigidity and impact strength intrinsic to original polycarbonate resins.

In order to further improve the mechanical strength of polycarbonate resins, fibrous fillers such as glass fibers, carbon fibers and the like have heretofore been added to the resins. The fibrous fillers added to the resins could greatly improve the mechanical strength, including the rigidity, the tensile strength and the impact strength of the resins. However, increasing their amount so as to satisfactorily improve the mechanical strength of the resins will often lower the moldability of the resins and will even worsen the outward appearance of the moldings of the resins. The moldings with bad appearance are problematic in that they require surface treatment such as painting.

SUMMARY OF THE INVENTION

The invention is to provide a polycarbonate resin composition having good moldability to give moldings with good appearance, good flame retardancy, high rigidity and high impact strength, and also housings made of the resin composition for electric and electronic instruments.

We, the present inventors have assiduously studied so as to solve the problems noted above, and, as a result, have found that the object noted above can be attained by a polycarbonate resin composition containing additive components of a fibrous filler, a terpene resin, a composite rubber-based graft copolymer, a halogen-free phosphate compound and a polytetrafluoroethylene, all added to a polycarbonate resin in specific ratios. On the basis of this finding, we have completed the invention.

Specifically, the invention herein provides the following:

[1] A polycarbonate resin composition comprising a combination of (a) from 14.8 to 91.5% by weight of a polycarbonate resin, (b) from 1 to 50% by weight of a fibrous filler, (c) from 2 to 8% by weight of a terpene resin, (d) from 2 to 8% by weight of a composite rubber-based graft copolymer, and (e) a halogen-free phosphate compound in an amount of from 0.8 to 1.2 times the total weight of the terpene resin and the composite rubber-based graft copolymer, to which is added (f) from 0.05 to 1.0 part by weight, relative to 100 parts by weight of the total of (a), (b), (c), (d) and (e), of a polytetrafluoroethylene.

[2] The polycarbonate resin composition of [1], wherein the composite rubber-based graft copolymer has an unseparable, entangled structure of from 1 to 99% by weight of a polyorganosiloxane rubber component and from 1 to 99% by weight of a polyalkyl acrylate rubber component, and is prepared by graft-polymerizing a composite rubber having a mean grain size of from 0.01 to 0.6 $\mu$m with one or more vinyl monomers.

[3] A housing for electric and electronic instruments or office automation appliances, as produced by molding the polycarbonate resin composition of [1] or [2].

DETAILED DESCRIPTION OF THE INVENTION

The polycarbonate resin (a) to be in the polycarbonate resin composition of the invention may be prepared in any ordinary method of reacting a diphenol with a polycarbonate precursor such as phosgene, carbonate compounds, etc.

More concretely, polycarbonate resins as prepared through reaction of a diphenol with phosgene or transesterification of a diphenol with diphenyl carbonate or the like, in a solvent of methylene chloride or the like in the presence of an acid acceptor and a molecular weight-controlling agent, to which is optionally added a branching agent, are preferably used in the invention.

The diphenol includes, for example, bis(hydroxyaryl)alkanes such as bis(4-hydroxyphenyl)methane, 1,1-bis(4-hydroxyphenyl)ethane, 2,2-bis(4-hydroxyphenyl)propane, bis(4-hydroxyphenyl)naphthylmethane, 1,1-bis(4-hydroxy-t-butylphenyl)propane, 2,2-bis(4-hydroxy-3,5-dimethylphenyl)propane, etc.; bis(hydroxyaryl)

cycloalkanes such as 1,1-bis(4-hydroxyphenyl) cyclopentane, 1,1-bis(4-hydroxyphenyl)cyclohexane, 1,1-bis(4-hydroxyphenyl)-3,5,5-trimethylcyclohexane, etc.; dihydroxydiaryl ethers such as 4,4'-dihydroxydiphenyl ether, 4,4'-dihydroxy-3, 3'-dimethyldiphenyl ether, etc.; dihydroxydiarylsulfides such as 4,4'-dihydroxydiphenylsulfide, 4,4'-dihydroxy-3,3'-dimethyldiphenylsulfide, etc.; dihydroxydiarylsulfoxides such as 4,4'-dihydroxydiphenylsulfoxide, 4,4'-dihydroxy-3, 3'-dimethyldiphenylsulfoxide, etc.; dihydroxydiarylsulfones such as 4,4'-dihydroxydiphenylsulfone, 4,4'-dihydroxy-3,3'-dimethyldiphenylsulfone, etc.; dihydroxydiphenyls such as 4,4'-dihydroxydiphenyl, etc. Of those diphenols, especially preferred is 2,2-bis(4-hydroxyphenyl)propane. One or more of these diphenols may be used either singly or as combined.

The carbonate compound includes, for example, diaryl carbonates such as diphenyl carbonate, etc.; dialkyl carbonates such as dimethyl carbonate, diethyl carbonate, etc.

As the molecular weight-controlling agent, preferably used as monophenols. Examples of the monophenols include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, etc. Of those monophenols, especially preferred are p-t-butylphenol, p-cumylphenol, and p-phenylphenol.

As the branching agent, for example, preferably used are 1,1,1-tris(4-hydroxyphenyl)ethane, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl) ethyl]benzene, phloroglucinol, trimellitic acid, isatinbis(o-cresol), etc.

As the polycarbonate (a) to be in the polycarbonate resin composition of the invention, used are those as prepared by reacting a diphenol such as that mentioned above with a polycarbonate precursor, for example, phosgene or a carbonate compound such as that mentioned above. Preferably, the polycarbonate resins for use in the invention have a viscosity-average molecular weight of from 10,000 to 100,000, more preferably from 14,000 to 40,000.

As preferred examples of the fibrous filler (b) to be in the polycarbonate resin composition of the invention, mentioned are glass fibers, carbon fibers, potassium titanate, aluminium borate, boron fibers, silicon nitride whiskers, and mineral fibers. Of those fibrous fillers, especially preferred are glass fibers and carbon fibers.

Preferably, the glass fibers for use in the invention are formed from alkali glass, low-alkali glass, or non-alkali glass, and their length in the resin composition of the invention may fall between 0.01 and 2 mm, more preferably between 0.05 and 1 mm. While added to and kneaded with a polycarbonate resin, glass fibers are cut. Therefore, the original length of the glass fibers to be in the resin composition preferably falls between 1 and 6 mm. Also preferably, the glass fibers have a diameter falling between 1 and 20 μm. For their forms, the glass fibers may be in any form of rovings, milled fibers or chopped fibers. It is desirable to process the glass fibers with a surface-treating agent so as to improve their adhesiveness with a polycarbonate resin. After having been processed with a surface-treating agent, the glass fibers are desirably bound with a binder into bundles, prior to being mixed with a polycarbonate resin.

The surface-treating agent employable herein includes, for example, silane-based coupling agents such as aminosilane coupling agents, epoxysilane coupling agents, vinylsilane coupling agents, acrylsilane coupling agents, etc.; as well as titanate-based coupling agents, aluminium-based coupling agents, chromium-based coupling agents, zirconium-based coupling agents, boron-based coupling agents, etc. Of those, especially preferred are silane-based coupling agents. The surface treatment may be effected in any ordinary manner, for example, according to an aqueous solution method, an organic solvent method or a spraying method.

As the binder, usable are any of urethane-based binders, acrylic binders, acrylonitrile-styrene copolymer-based binders, and epoxy-based binders. Binding the glass fibers with any of those binders may be effected in any ordinary manner, for which, for example, employable is dipping, roller-coating, gun-coating, flow-coating or spraying.

As the fibrous filler (b) to be in the polycarbonate resin composition of the invention, any of those mentioned hereinabove may be used singly, or, if desired, may be combined with any other tabular or spherical fillers.

The tabular fillers include, for example, glass flakes, mica, talc, etc. It is desirable that the tabular fillers have a major diameter of not larger than 2,000 μm, preferably from 0.5 to 1,000 μm, and an aspect ratio (major diameter/thickness) of not smaller than 5, preferably not smaller than 10. Tabular fillers having a major diameter of larger than 2,000 μm are unfavorable, since they could not be uniformly mixed with a polycarbonate resin and will cause a trouble of spots in moldings. Those having an aspect ratio of smaller than 5 are also unfavorable, since they will detract from the dimension stability and the impact resistance of moldings.

The spherical fillers include, for example, glass beads, glass balloons, calcium carbonate, etc. Preferably, their grain size falls between 0.5 and 200 μm, more preferably between 1 and 100 μm.

As the terpene resin (c) to be in the polycarbonate resin composition of the invention, preferred are homopolymers of terpene monomers, copolymers of terpene monomers and aromatic compounds, as well as hydrogenated terpene resins to be prepared by hydrogenating such homopolymers and copolymers.

The terpene monomers include, for example, α-pinene, β-pinene, dipentene, d-limonene, etc. The aromatic compounds include, for example, vinyl group-having aromatic compounds such as styrene, α-methylstyrene, vinyltoluene, etc.; phenolic compounds such as phenol, cresol, 2,2-bis(4-hydroxyphenyl)propane, etc. Terpene resins as prepared by homopolymerizing those terpene monomers or copolymerizing them with aromatic compounds such as those mentioned above, in an organic solvent in the presence of a Friedel-Crafts catalyst, are preferably used in the invention.

As the composite rubber-based graft copolymer (d) to be in the polycarbonate resin composition of the invention, preferred are those as prepared by graft-polymerizing a composite rubber with one or more vinyl monomers.

One preferred embodiment of the composite rubber-based graft copolymer (d) for use in the invention has an unseparable, entangled structure of from 1 to 99% by weight of a polyorganosiloxane rubber component and from 1 to 99% by weight of a polyalkyl acrylate rubber component, and is prepared by graft-polymerizing a composite rubber having a mean grain size of from 0.01 to 0.6 µm with one or more vinyl monomers.

The composite rubber-based graft copolymer may be produced in various methods. For producing it, for example, monomers for polyalkyl acrylate rubbers are infiltrated into rubber particles in a polyorganosiloxane rubber latex, and then polymerized in the rubber particles.

The polyorganosiloxane rubber may be prepared by mixing a linear organosiloxane such as dimethylsiloxane or the like with from 0.1 to 30% by weight of a polyfunctional, silane-based crosslinking agent such as trimethoxysilane, tetraethoxysilane or the like, and polymerizing it in emulsion. The emulsion polymerization may be effected more favorably by mixing them in water in the presence of a sulfonic acid-based emulsifier such as an alkylbenzenesulfonic acid, an alkylsulfonic acid or the like, for example, in a homogenizer.

The resulting polyorganosiloxane rubber latex is then neutralized with an aqueous alkali solution of sodium hydroxide or the like, to which are added an alkyl acrylate such as methyl acrylate, n-butyl acrylate or the like, a crosslinking agent such as ethylene glycol dimethacrylate or the like, and a grafting reaction promoter such as allyl methacrylate or the like. In that condition, those additives are infiltrated into the polyorganosiloxane rubber particles. Next, a radical polymerization initiator is added thereto, and the monomers are polymerized to give a composite rubber latex in which the crosslinked polyalkyl acrylate rubber structure formed is entangled in the crosslinked polyorganosiloxane rubber structure so that the two rubber components are substantially unseparable.

To the composite rubber, added are vinyl monomers such as those mentioned above, and these are radical-polymerized. Then, calcium chloride or the like is added to the resulting latex for salting out to obtain a composite rubber-based graft copolymer. As the vinyl monomers to be used herein, for example, preferred are alkenyl-aromatic compounds such as styrene, etc.; acrylates such as methyl acrylate, ethyl acrylate, etc.; methacrylates such as methyl methacrylate, ethyl methacrylate, etc.; vinyl cyanide compounds such as acrylonitrile, etc.

The halogen-free phosphate compound (e) to be in the polycarbonate resin composition of the invention includes, for example, monophosphates and polyphosphates of a general formula (1):

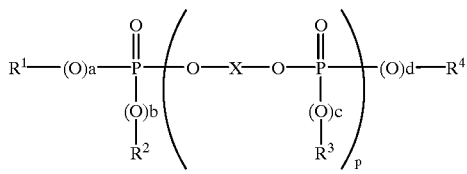
(1)

In formula (1), $R^1$ to $R^4$ each independently represent an optionally-substituted aryl group; X represents an optionally-substituted arylene group; a, b, c and d each represent 0 or 1; and p represents a number of from 0 to 5.

The substituents for the aryl and arylene groups include, for example, an alkyl group having from 1 to 10 carbon atoms, an alkoxy group having from 1 to 10 carbon atoms, an aryl group such as phenyl, tolyl, etc. The aryl and arylene groups may have one or more substituents. Where two or more phosphates are used, as combined, p in formula (1) shall be the average of p in plural phosphates.

Specific examples of the halogen-free phosphate compounds of formula (1) include monophosphates such as triphenyl phosphate, tricresyl phosphate, trixylenyl phosphate, tribiphenyl phosphate, etc.; and polyphosphates such as phenyl-resorcinol polyphosphate, phenyl-hydroquinone polyphosphate, phenyl-cresyl-resorcinol polyphosphate, phenyl-cresyl-hydroquinone polyphosphate, tetraphenyl-resorcinol diphosphate, tetraphenyl-hydroquinone diphosphate, phenyl-tricresyl-resorcinol diphosphate, phenyl-tricresyl-hydroquinone diphosphate, tetrabiphenyl-resorcinol diphosphate, tetrabiphenyl-hydroquinone diphosphate, etc. One or more of these phosphates may be used either singly or as combined.

The polytetrafluoroethylene (f) to be in the polycarbonate resin composition of the invention is not specifically defined, and may be any ordinary one. However, preferred are those that are grouped in Type 3 in the ASTM standard. For its properties, it is desirable that the polytetrafluoroethylene to be used herein could fibrillate, after having received shear stress of plasticization. This is because the polytetrafluoroethylene of that type is more effective for preventing the polycarbonate resin composition comprising it from melting to drip, and therefore has the ability to improve the flame retardancy of the composition.

One method for producing the polytetrafluoroethylene having the fibrillating ability comprises, for example, polymerizing tetrafluoroethylene in an aqueous medium in the presence of sodium, potassium or ammonium peroxydisulfide, under a pressure falling between 1 and 100 psi and at a temperature falling between 0 and 200° C., preferably between 20 and 100° C.

Regarding the proportions of the components (a) to (f) that constitute the polycarbonate resin composition of the invention, the amount of the polytetrafluoroethylene (f) is from 0.05 to 1.0 part by weight relative to 100 parts by weight of the total weight of the other components (a) to (e), for which the polycarbonate resin (a) is from 14.8 to 91.5% by weight, the fibrous filler (b) is from 1 to 50% by weight, the terpene resin (c) is from 2 to 8% by weight, the composite rubber-based graft copolymer (d) is from 2 to 8% by weight, and the halogen-free phosphate compound (e) is from 0.8 to 1.2 times the total weight of the terpene resin and the composite rubber-based graft copolymer, as so mentioned hereinabove.

The proportion of the polycarbonate resin (a) is from 14.8 to 91.5% by weight, but preferably from 50 to 80% by weight. If it oversteps the defined range, the resulting polycarbonate resin composition could not attain the object of the invention.

The proportion of the fibrous filler (b) falls between 1 and 50% by weight, but preferably between 5 and 30% by weight. Where the fibrous filler is combined with any other tabular fillers and spherical fillers to be the component (b), the total amount of the combined fillers shall fall within the range defined for the component (b) as above. If the proportion of the fibrous filler (b) is smaller than 1% by weight, the mechanical strength of the resulting polycarbonate resin composition could not be satisfactorily increased; and if larger than 50% by weight, the moldings of the composition will have bad appearance.

The proportion of the terpene resin (c) falls between 2 and 8% by weight, but preferably between 4 and 6% by weight. If it is smaller than 2% by weight, the fluidity of the resulting polycarbonate resin composition could not be satisfactorily high; and if larger than 8% by weight, the flame retardancy and the heat resistance of the composition will be poor.

The proportion of the composite rubber-based graft copolymer (d) falls between 2 and 8% by weight, but preferably between 4 and 6% by weight. If it is smaller than 2% by weight, the impact resistance of the resulting polycarbonate resin composition could not be satisfactorily high; and if larger than 8% by weight, the flame retardancy of the composition will be poor.

The proportion of the halogen-free phosphate compound (e) falls between 0.8 and 1.2 times the total weight of the terpene resin (c) and the composite rubber-based graft copolymer (d). If it is smaller than 0.8 times the total weight of the components (c) and (d), thin moldings of the composition could not have good flame retardancy; and if larger than 1.2 times the same, the flame retardancy of the moldings will be good, but, unfavorably, the heat resistance and the impact resistance thereof will be poor.

The proportion of the polytetrafluoroethylene (f) falls between 0.05 and 1.0 part by weight, but preferably between 0.1 and 0.5 parts by weight, relative to 100 parts by weight of the total amount of the components (a) to (e). If it is smaller than 0.05 parts by weight, the resulting polycarbonate resin composition could not satisfactorily exhibit the ability of the component (f) to prevent the composition from melting to drip; and if larger than 1.0 part by weight, the moldings of the composition will have unfavorably bad appearance.

The polycarbonate resin composition of the invention comprises the components (a) to (f) in the ratios noted above. Apart from those components, the composition may optionally contain any other various inorganic fillers and additives and even synthetic resins other than polycarbonate resins within the range not interfering with the object of the invention.

The optional inorganic fillers include, for example, carbon flakes, carbon black, calcium sulfate, calcium silicate, titanium oxide, alumina, silica, asbestos, clay, quartz powder, etc. The optional additives include, for example, antioxidants of hindered phenols, phosphates, phosphites, amines, etc.; ultraviolet absorbents of benzotriazoles, benzophenones, etc.; external lubricants and mold releasing agents of aliphatic carboxylates, paraffins, silicone oils, polyethylene waxes, etc.; and also antistatic agents, colorants, etc. The optional synthetic resins include, for example, polyethylenes, polypropylenes, polystyrenes, acrylonitrile-styrene copolymer resins, acrylonitrile-butadiene-styrene copolymer resins, polymethyl methacrylates, etc.

The method for producing the polycarbonate resin composition by mixing the components (a) to (f) is not specifically defined, and any ordinary method is employable for producing it. For the method, for example, employable are any of ribbon blenders, Henschel mixers, Banbury mixers, drum tumblers, single-screw extruders, double-screw extruders, co-kneaders, multi-screw extruders, etc. In the method, the mixing temperature preferably falls between 240 and 280° C.

The polycarbonate resin composition thus produced has high fluidity and good moldability, and is therefore easy to mold in various molding methods. Concretely, for example, the composition may be molded through injection molding, blow molding, extrusion molding, compression molding, calender molding, rotary molding, etc.

The moldings of the polycarbonate resin composition of the invention may have various shapes, and they are lightweight and have high rigidity, high impact strength, good flame retardancy and good appearance not requiring finish coating. Because of such their excellent, practicable properties, the moldings are especially preferably used in the field of thin-wall housings for electric and electronic instruments and those for office automation appliances.

In the field of electric and electronic instruments and office automation appliances, the moldings have many applications to more compact and lightweight housings, for example, for notebook-type personal computers, battery packages for communication instruments such as portable telephones, etc.

Since the materials for the moldings contain neither bromine nor chloride for flame retardancy, the moldings can be scrapped into wastes that form few harmful substances such as dioxins, etc.

The invention is described in more detail with reference to the following Examples, which, however, are not intended to restrict the scope of the invention.

EXAMPLE 1

As the component (a), used was a polycarbonate resin produced from 2,2-bis(4-hydroxyphenyl)propane and having a viscosity-average molecular weight of 21,000 (Toughlon FN2200A from Idemitsu Petrochemical); and as the fibrous filler (b), used were glass fibers having a diameter of 13 $\mu$m (MA409C from Asahi Fiber Glass). As the terpene resin (c), used was an aromatic modified terpene resin (YS Resin TR-105 from Yasuhara Chemical); as the composite rubber-based graft copolymer (d), used was a copolymer of methyl methacrylate/alkyl acrylate/dimethylsiloxane (Metablen S-2001 from Mitsubishi Rayon); and as the halogen-free phosphate compound (e), used was phenyl-resorcinol polyphosphate (phosphorus content: 10.8% by weight) (Adekastab PFR from Asahi Denka Kogyo).

These components were in a ratio, (a)/(b)/(c)/(d)/(e) of 70/10/5/5/10 (% by weight). In those, the proportion of the component (e) corresponds to 1 time the sum of the components (c) and (d).

As the component (f), used was polytetrafluoroethylene (Polyflon TFEF201L from Daikin Industries). Its proportion was 0.3 parts by weight relative to 100 parts by weight of the total of the components (a) to (e).

The mixture of these components (a) to (f) was fed into a double-screw extruder having an inner diameter of 35 mm, melted and kneaded therein and extruded out at a cylinder temperature of 260° C. and a screw revolution of 300 rpm, and pelletized into pellets of the polycarbonate resin composition. A part of the resin pellets were dried at 80° C. for 5 hours, and then molded in an injection molding machine at a temperature of 280° C. to give test pieces for measurement of physical properties.

The test pieces were tested for the physical properties of the polycarbonate resin composition. Precisely, the flexural modulus was measured at room temperature according to JISK7203. The deformation(deflection) temperature under load was measured according to JISK7207. The Izod impact strength was measured at room temperature according to JISK7110. The fluidity was measured at a temperature of 280° C. under a load of 160 kg/cm$^2$, according to JISK7210. The flame retardancy was measured in a vertical combustion test according to the UL (Underwriters Laboratories) Standards, Subject 94. For their outward appearance, tabular moldings having a square size of 140 mm×140 mm and a thickness of 2 mm were prepared through injection molding at 280° C., and visually inspected. In the visual inspection, samples that had been well molded with good mold transferability in good design and with no defects such as weld lines and the like on their surface were decided good (⊚ in Table 1); those that were somewhat inferior to good samples were decided average (Δ in Table 1); and those with defects were decided bad (X in Table 1). In addition, the surface gloss at an angle of 60° (relative to the direction vertical to the resin flow direction) of each sample was measured on the surface corresponding to the mirror surface of the mold used, according to JISK7105. The test data obtained are all shown in Table 1. In Table 1, PTFE1 indicates the polytetrafluoroethylene used in Example 1.

EXAMPLE 2

The starting components (a) to (e) used herein were the same as those in Example 1. These were processed in the same manner as in Example 1, except that the proportion of the component (a) was changed to 60% by weight and that of the component (b) to 20% by weight. As the component (f), used was 0.3 parts by weight of polytetrafluoroethylene (Fluon Fine Powder CD076 from Asahi Glass). From those starting components, produced was a polycarbonate resin composition and its physical properties were measured and evaluated in the same manner as in Example 1.

The test data obtained are shown in Table 1. In Table 1, PTFE2 indicates the polytetrafluoroethylene used in Example 2.

EXAMPLE 3

The starting components (a) to (e) used herein were the same as those in Example 1. These were processed in the same manner as in Example 1, except that the ratio (a)/(b)/(c)/(d)/(e) was changed to 58/20/7/4/11 (% by weight). The component (f) and its proportion used herein were the same as those in Example 1. From those starting components, produced was a polycarbonate resin composition and its physical properties were measured and evaluated in the same manner as in Example 1.

The test data obtained are shown in Table 1.

EXAMPLE 4

Except for the component (b), the same starting components (a) to (e) as in Example 1 were used herein. As the component (b), herein used were carbon fibers having a diameter of 6 μm (HTA-C6-SR from Toho Rayon) but not glass fibers. These were processed in the same manner as in Example 1, except that the ratio (a)/(b)/(c)/(d)/(e) was changed to 65/10/7/6/12 (% by weight). In this case, the proportion of the component (e) corresponds to 0.92 times the sum of the components (c) and (d). The component (f) and its proportion used herein were the same as those in Example 1. From those starting components, produced was a polycarbonate resin composition and its physical properties were measured and evaluated in the same manner as in Example 1.

The test data obtained are shown in Table 1.

Comparative Example 1

The same process as in Example 1 was repeated, except that the fibrous filler (b) was not used and that the proportion of the polycarbonate resin (a) was changed to 80% by weight.

The polycarbonate resin composition obtained was tested for its physical properties in the same manner as in Example 1. As a result, the flexural modulus of the moldings of the composition was found low. This means that the moldings are not applicable to thin-wall housings for office automation appliances such as notebook-type personal computers and others and for portable communication instruments.

The test data obtained herein are shown in Table 2.

Comparative Example 2

The same process as in Example 1 was repeated, except that the ratio of the starting components, (a)/(b)/(c)/(d)/(e) was changed to 74/10/5/5/6 (% by weight.). In this case, the proportion of the component (e) corresponds to 0.6 times the sum of the components (c) and (d).

The polycarbonate resin composition obtained was tested for its physical properties in the same manner as in Example 1. As a result, it was found that the flame retardancy of the moldings of the composition was low and that the outward appearance thereof was not good. This means that the moldings could not be directly used as housings for appliances and instruments such as those mentioned above, if not over-coated.

The test data obtained herein are shown in Table 2.

Comparative Example 3

The same process as in Example 1 was repeated, except that the ratio of the starting components, (a)/(b)/(c)/(d)/(e) was changed to 56/20/5/5/14 (% by weight.). In this case, the proportion of the component (e) corresponds to 1.4 times the sum of the components (c) and (d).

The polycarbonate resin composition obtained was tested for its physical properties in the same manner as in Example 1. As a result, the flame retardancy and the heat resistance of the moldings of the composition were found low.

The test data obtained herein are shown in Table 2.

Comparative Example 4

The same process as in Example 1 was repeated, except that the terpene resin (c) was not used and that the ratio of the starting components, (a)/(b)/(d)/(e) was 75/10/5/10 (% by weight.).

Testing the polycarbonate resin composition obtained herein for its physical properties was tried in the same manner as in Example 1. However, since its fluidity was too low, the composition could not be well molded into moldings having a thickness of 1 mm or smaller. In addition, the outward appearance of the moldings of the composition was not good. This means that the moldings could not be directly used as housings for appliances and instruments such as those mentioned above, if not over-coated.

The test data obtained herein are shown in Table 2.

Comparative Example 5

The same process as in Example 1 was repeated, except that the ratio of the starting components, (a)/(b)/(c)/(d)/(e) was changed to 74/10/5/1/10 (% by weight.). In this case, the proportion of the component (e) corresponds to 1.67 times the sum of the components (c) and (d).

The polycarbonate resin composition obtained was tested for its physical properties in the same manner as in Example 1. As a result, the impact strength of the moldings of the composition was found low. This means that the moldings are not suitable to housings for appliances and instruments such as those mentioned above.

The test data obtained herein are shown in Table 2.

Comparative Example 6

The same process as in Example 1 was repeated, except that the ratio of the starting components, (a)/(b)/(c)/(d)/(e) was changed to 55/20/10/5/10 (% by weight.). In this case, the proportion of the component (e) corresponds to 0.67 times the sum of the components (c) and (d).

The polycarbonate resin composition obtained was tested for its physical properties in the same manner as in Example 1. As a result, the flame retardancy of the moldings of the composition was found low.

The test data obtained herein are shown in Table 2.

Comparative Example 7

The same process as in Example 1 was repeated, except that the ratio of the starting components, (a)/(b)/(c)/(d)/(e) was changed to 51/20/10/5/14 (% by weight.). In this case, the proportion of the component (e) corresponds to 0.93 times the sum of the components (c) and (d).

The polycarbonate resin composition obtained was tested for its physical properties in the same manner as in Example 1. As a result, it was found that the impact strength of the moldings of the composition was low and that the heat resistance thereof as evaluated in terms of the deformation temperature under load (° C.) was also low.

The test data obtained herein are shown in Table 2.

Comparative Example 8

The same process as in Example 1 was repeated, except that a polycaprolactone resin (Placcel H4 from Daisel Chemical Industry) was used as the component (c) in place of the aromatic modified terpene resin in Example 1.

The polycarbonate resin composition obtained was tested for its physical properties in the same manner as in Example 1. As a result, it was found that the impact strength of the moldings of the composition was low and that the heat resistance thereof as evaluated in terms of the deformation temperature under load (° C.) was also low.

The test data obtained herein are shown in Table 2.

TABLE 1

|  | Example 1 | Example 2 | Example 3 | Example 4 |
|---|---|---|---|---|
| (a) Polycarbonate resin (wt. %) | 70 | 60 | 58 | 65 |
| (b) Glass fibers (wt. %) | 10 | 20 | 20 | |
| Carbon fibers (wt. %) | | | | 10 |

TABLE 1-continued

|  | Example 1 | Example 2 | Example 3 | Example 4 |
|---|---|---|---|---|
| (c) Terpene resin (wt. %) | 5 | 5 | 7 | 7 |
| (d) Composite Rubber Component (wt. %) | 5 | 5 | 4 | 6 |
| (e) Phosphate (wt. %) | 10 | 10 | 11 | 12 |
| (f) PTFE1 (wt. %) | 0.3 | | 0.3 | 0.3 |
| PTFE2 (wt. %) | | 0.3 | | |
| Flexural modulus (MPa) | 4300 | 6800 | 7000 | 5500 |
| Deformation temperature under load (° C.) | 101 | 102 | 100 | 101 |
| Impact strength (kJ/m$^2$) | 13 | 11 | 10 | 12 |
| Fluidity (x 10$^{-2}$ ml/sec) | 36 | 24 | 30 | 40 |
| Flame Retardancy [UL-94] (Result) | 0.8 mm V-0 (passed) | 0.8 mm V-0 (passed) | 1.0 mm V-0 (passed) | 1.0 mm V-0 (passed) |
| Surface Appearance Evaluation | ◎ | ◎ | ◎ | ◎ |
| 60° Surface Gloss | 90 | 87 | 89 | 86 |

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| (a) Polycarbonate resin (wt. %) | 80 | 74 | 56 | 75 | 74 | 55 | 51 | 70 |
| (b) Glass fibers (wt. %) | | 10 | 20 | 10 | 10 | 20 | 20 | 10 |
| Carbon fibers (wt. %) | | | | | | | | |
| (c) Terpene resin (wt. %) | 5 | 5 | 5 | | 5 | 10 | 10 | |
| Polycaprolactone (wt. %) | | | | | | | | 5 |
| (d) Composite Rubber Component (wt. %) | 5 | 5 | 5 | 5 | 1 | 5 | 5 | 5 |
| (e) Phosphate (wt. %) | 10 | 6 | 14 | 10 | 10 | 10 | 14 | 10 |
| (f) PTFE1 (wt. %) | 0.3 | | 0.3 | 0.3 | 0.3 | 0.3 | 0.3 | 0.3 |
| PTFE2 (wt. %) | | 0.3 | | | | | | |
| Flexural modulus (MPa) | 2500 | 4200 | 7000 | 4200 | 4100 | 6800 | 6500 | 4300 |
| Deformation temperature under load (° C.) | 92 | 115 | 88 | 106 | 101 | 91 | 82 | 88 |
| Impact strength (kJ/m$^2$) | 52 | 13 | 9 | 14 | 5 | 9 | 6 | 8 |
| Fluidity (x 10$^{-2}$ ml/sec) | 45 | 21 | 34 | 18 | 37 | 32 | 46 | 42 |
| Flame Retardancy [UL-94] (Result) | 1.0 mm V-O (passed) | 1.0 mm V-O (failed) | 1.0 mm V-O (failed) | 1.0 mm V-O (passed) | 1.0 mm V-O (passed) | 1.0 mm V-O (failed) | 1.0 mm V-O (passed) | 1.0 mm V-O (passed) |
| Surface Appearance Evaluation | ◎ | Δ to X | ◎ | Δ | Δ | ◎ | ◎ | ◎ |
| 60° Surface Gloss | 94 | 56 | 89 | 68 | 72 | 85 | 89 | 90 |

As has been described in detail hereinabove, the polycarbonate resin composition of the invention ensures good flame retardancy without having any negative influences on the environment. As having good fluidity and good moldability, the composition can be well molded into thin-wall moldings with good appearance. Thin-wall moldings of the composition have high rigidity and high impact resistance. Accordingly, the composition has many applications to compact and lightweight housings for electric and electronic instruments and for office automation appliances.

While the invention has been described in detail and with reference to specific embodiments thereof, it will be apparent to one skilled in the art that various changes and modifications can be made therein without departing from the spirit and scope thereof.

What is claimed is:

1. A polycarbonate resin composition, comprising a combination of:
   (a) from 50 to 80% by weight of a polycarbonate resin having a viscosity average molecular weight ranging from 14,000 to 40,000;
   (b) from 1 to 50% by weight of a fibrous filler;
   (c) from 2 to 8% by weight of a terpene resin;

(d) from 2 to 8% by weight of a composite rubber-based graft copolymer; and (e) a halogen-free phosphate compound in an amount ranging from 0.8 to 1.2 times the total weight of said terpene resin and said composite rubber-based graft copolymer, to which is added (f) from 0.05 to 1.0 part by weight, relative to 100 parts by weight of the total of (a), (b), (c), (d) and (e), of a polytetrafluoroethylene.

2. The polycarbonate resin composition of claim 1, wherein the composite rubber-based graft copolymer has an inseparable, entangled structure of from 1 to 99% by weight of a polyorganosiloxane rubber component and from 1 to 99% by weight of a polyalkyl acrylate rubber component, and is prepared by graft-polymerizing a composite rubber having a mean grain size of from 0.01 to 0.6 $\mu$m with one or more vinyl monomers.

3. The polycarbonate resin composition of claim 1, wherein the amount of said terpene resin ranges from 4 to 6% by weight.

4. The polycarbonate resin composition of claim 1, wherein the amount of said composite rubber-based graft copolymer ranges from 4 to 6% by weight.

5. The polycarbonate resin composition of claim 1, wherein the amount of said polytetrafluoroethylene ranges from 0.1 to 0.5 parts by weight.

6. The polycarbonate resin composition of claim 1, wherein the amount of said filler ranges from 5 to 30% by weight.

7. The polycarbonate resin composition of claim 1, wherein the resin component (a) further consists essentially of at least one synthetic resin selected from the group consisting of polyethylenes, polypropylenes, polystyrenes, acrylonitrile-styrene copolymer resins, acrylonitrile-butadiene-styrene copolymer resins and polymethyl methacrylates.

8. A housing for electric and electronic instruments or office automation appliances prepared by molding the polycarbonate resin composition according to claim 1.

9. A housing for electric and electronic instruments or office automation appliances prepared by molding the polycarbonate resin composition according to claim 2.

* * * * *